United States Patent [19]

Nishimori

[11] Patent Number: 4,609,327
[45] Date of Patent: Sep. 2, 1986

[54] SUBMERGIBLE PUMP

[75] Inventor: Sinji Nishimori, Kanagawa, Japan

[73] Assignee: Ebara Corporation, Tokyo, Japan

[21] Appl. No.: 784,050

[22] Filed: Oct. 4, 1985

Related U.S. Application Data

[62] Division of Ser. No. 603,896, Apr. 24, 1984, Pat. No. 4,560,476.

[30] Foreign Application Priority Data

Apr. 30, 1983 [JP] Japan .............................. 58-66029[U]

[51] Int. Cl.⁴ ............................................. F01D 15/00
[52] U.S. Cl. ............................ 415/121 B; 415/121 G
[58] Field of Search ...................... 415/121 B, 121 G; 417/360, 422, 424

[56] References Cited

U.S. PATENT DOCUMENTS

| 2,496,359 | 2/1950 | Ryman | 415/121 B |
| 2,851,956 | 9/1958 | Lung | 415/121 G |
| 3,136,258 | 6/1964 | Bood | 417/424 |
| 3,802,806 | 4/1974 | Blum | 415/121 G |

Primary Examiner—Richard E. Gluck
Attorney, Agent, or Firm—Oblon, Fisher, Spivak, McClelland, & Maier

[57] ABSTRACT

A submergible pump comprising a motor section, a pump section comprising a pump casing and a pump impeller mounted on the distal end of a motor shaft in the motor section, and a support serving also as a strainer. The motor section, the pump casing, and the support are easily assembled and disassembled by plural bolts the heads of which are retained unmovably in bushings disposed circumferentially in the support.

3 Claims, 9 Drawing Figures

SUBMERGIBLE PUMP

This is a division of application Ser. No. 603,896, filed Apr. 24, 1984, now U.S. Pat. No. 4,560,476.

FIELD OF INVENTION

The present invention relates to a pump construction and more specifically to a a submergible pump.

BACKGROUND OF INVENTION

A strainer used in a submergible pump of prior art has usually been made in a cylindrical tube form having a plurality of longitudinal slits or a plurality of perforations on the cylindrical surface through which the liquid is sucked into the pump. Such strainer has been generally made by a casting process or of a sheet metal and directly attached to a pump body at its suction opening.

The slits or perforations are choked with foreign materials during use and, when soft items such as fibrous foreign materials are caught in the slits or perforations, the ends of such foreign fibrous materials may become entangled with each other thereby making it difficult and troublesome to remove them from the strainer. Also, such strainer is likely to be choked with other foreign materials and, therefore, the length of slits or number of perforations is generally increased to provide some surplus operating time whereby the axial length of the strainer is lengthened which causes a condition wherein the water cannot be satisfactorily pumped out close to the water bottom because the position of the suction opening is made higher due to the increased axial length of the strainer.

Also, when the operation of the submergible pump is stopped, the delivery water containing foreign materials may flow backward to cause clogging of the strainer so that further actuation of the pump becomes impossible.

Such clogging of the strainer due to backward flow of the delivery water is difficult to clear if the foreign materials trapped these contain fibrous items because pulling the trapped fibrous materials from the outside of the strainer will cause them to be tightly pushed into the slits or perforations together with other foreign materials. Therefore, it is necessary to dismantle the strainer for the purpose of cleaning the trapped materials therefrom.

SUMMARY OF INVENTION

Accordingly, it is an object of the present invention to provide a submergible pump which is free from the drawbacks noted above.

Thus, it is an object of the present invention to provide a submergible pump having an improved strainer in which trapping of the fibrous materials is prevented, suctioning the water close to the water bettom is possible, the chance of clogging by the backward flow at the time of stopping operation of the pump is minimized and removal of the trapped materials or dismantling of the strainer for maintenance is made easy.

The above objects are accomplished according to the present invention wherein a plurality of stopping elements are circumferentially disposed on the strainer of a plate or disk form and each of these elements is elongated in the radial direction and parallel to the axial direction so that the radial flow passages are formed at opposite radial sides of the elements between the adjacent elements and the axial tip of each element is spaced from the pump body around the suction opening thereof.

Also, the strainer is easily assembled or dismantled in the submergible pump according to the present invention.

Further objects and advantages of the present invention will be made clear when the detailed description of the preferred embodiments is reviewed in conjunction with the accompanying drawings, the brief description of which is summarized below.

DETAILED DESCRIPTION OF PREFERRED EMBODIMENTS

Figure 1:
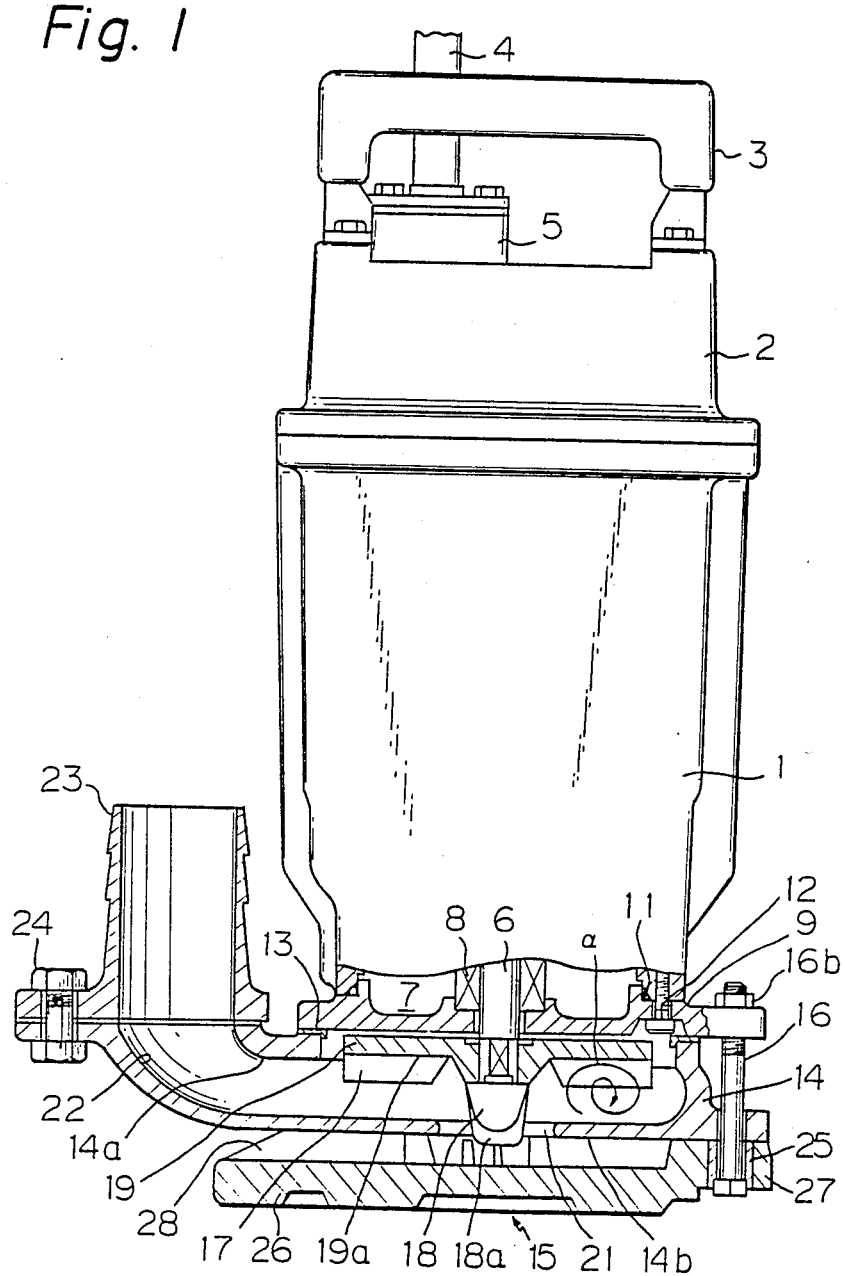
FIG. 1 is a side view of a submergible pump partly in cross section according to the present invention.

Referring to FIG. 1, there is shown a side view of a submergible pump assembly partly in section which is provided with a strainer 15 (also referred to as a "pump support 15").

The motor section of the submergible pump assembly comprises a motor frame 1 in which a motor is housed, a motor cover 2 attached to the upper part of the motor frame 1, a handle 3 secured to the motor cover 2, a cable connector 5, a submergible cable 4 coupled to the stator of the motor through the connector 5, and a shaft 6 attached to the rotor of the motor and journalled by means of bearings (not shown). At the lower portion of the motor frame 1, an intermediate casing 9 is mounted with a seal ring 11 disposed therebetween and is secured to the motor frame 1 by bolts 12 screwed into the frame to form a shaft seal chamber 7. The shaft 6 extends downwardly through a shaft seal means 8 such as a mechanical seal disposed at the lower part of the intermediate casing 9.

A pump section comprises a pump casing 14 abutting against the lower end of the intermediate casing 9 with a seal packing 13 interposed therebetween, a pump support 15 abutting against the lower surface of the pump casing 14 and an impeller 17 mounted at the distal end of the motor shaft 6 extending into the pump casing 14.

The intermediate casing 9, the pump casing 14 and the pump support 15 are tightly fastened by means of bolts 16 and nuts 16b associated therewith and, therefore, disassembling of these parts is made easy. The upper portion of the pump support 15 serves as means for straining foreign materials from the incoming liquid into the pump section and, therefore, the pump support 15 may also be referred to as a strainer in the present specification and claims. The pump casing 14 is provided with a suction opening 21 at the lower wall of the casing and a discharge opening 22 leading to the vortex chamber of the casing.

Within the pump casing 14, the impeller 17 is secured to the distal end of the motor shaft 6 by conventional means such as the key on the shaft 6, the keyway on the internal bore of the impeller 17 and a fastening nut 18. In this preferred embodiment of the submergible pump, the impeller 17 is of a semi-open type and is disposed within the pump casing 14 which is not provided with an impeller chamber as is usually provided in the ordinary vortex pump. Thus, the impeller is not placed in such impeller chamber but the open side of the impeller 17 is spaced from the inner lower surface of the pump casing 14.

A front surface 19a of a main shroud 19 of the impeller 17 is arranged to be coplanar with an inner upper surface 14a of the pump casing 14. In the conventional submergible pump, there is possibility that the fibrous foreign materials may get into the recess between the outer periphery of the impeller and the impeller chamber; however, in the preferred embodiment shown in FIG. 1, the fibrous foreign materials will not clog such recess and such foreign materials easily move to the outside of the impeller towards the vortex chamber. The nut 18 tightening the impeller 17 to the shaft 6 may be given a single plate vane 18a which extends through the suction opening 21 slightly beyond the lower wall of the pump casing 14. At the discharge opening 22, a delivery conduit 23 is attached by fastening means 24 such as bolts and nuts.

Figure 2:
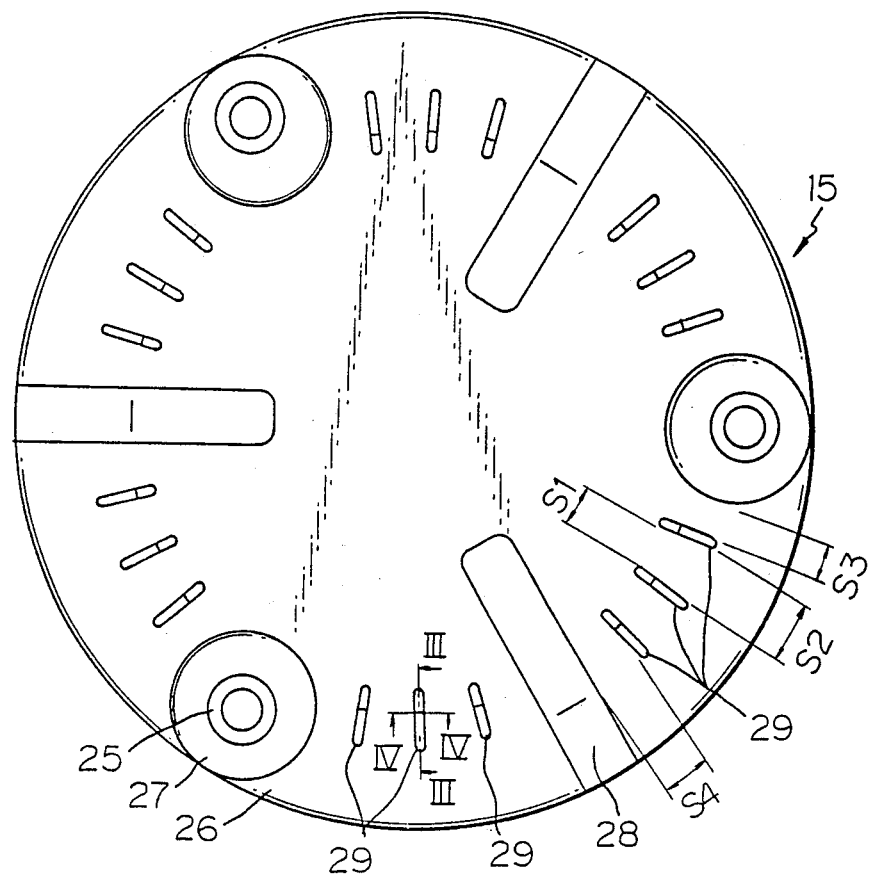
FIG. 2 is a plan view of the strainer shown in FIG. 1.

In FIG. 2, a plan view of the pump support or strainer 15 is illustrated. For attaching the strainer to complete the pump assembly by bolts 16 and nuts 16b as hereinfore explained in connection with FIG. 1, a plurality of fastening pads 27 are circumferentially provided on a pump base 26 and, in each of the pads, a bushing 25 is installed so as to provide a through hole for the fastening bolt 16. Also, a plurality of stabilizing seats 28 are circumferentially arranged on the base 26 so that the upper surfaces of the fastening pads 27 and the stabilizing seats abut against the outer lower surface of the pump casing 14 when the pump support 15 is tightened together with the motor section and the intermediate casing 9 by bolts 16 and nuts 16b. Also, on the same side of the support 15 as those of the pads 27 and seats 28, a plurality of stoppers 29 for foreign materials are circumferetially disposed so as to prevent foreign materials from being sucked into the pump casing 14 through the suction opening 21.

The stabilizing seats 28 are the upright protrusions on the upper surface of the base 26. Each of the stablizing seats 28 is extended radially from the periphery of the base 26 towards the center but terminates at a certain point so that the inner end of the seat may not interfere with the suction opening when the support 15 is assembled. Stoppers 29 are rather small pieces compared to the seats 28 and each of them also extends radially in the respective intermediate portions between the pad 27 and the seat 28. Each stopper 29 is also upright and is made of a thin piece elongated in the radial direction or from the central portion to the peripheral portion.

Figure 3:
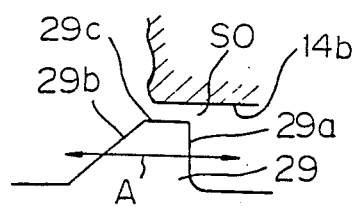
FIG. 3 is a cross-sectional view of a stopper of the strainer taken along the line III—III in FIG. 2.
Figure 4:
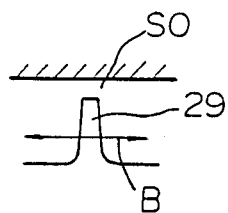
FIG. 4 is a cross-sectional view taken along the line IV—IV in FIG. 2.

In FIG. 3 and FIG. 4, there are shown schematic illustrations of the stopper 29 in cross sections along the lines III—III and IV—IV, respectively in FIG. 2. As shown in FIG. 3, the outer side of each stopper 29 forms an upright edge 29a and the opposite inner side forms a slanted edge 29b, both edges being connected by a top edge 29c. The top edge 29c is arranged to have a gap "S0" between the top edge 29c and the inner surface 14b of the lower wall of the pump casing 14.

As illustrated in FIG. 2, stoppers 29 are arranged radially and equally spaced from each other, and the flow passages formed between the adjacent stoppers are gradually narrowed in the direction from the periphery of the strainer to the central portion.

Thus, the relationship $$S2 > S1$$

is given wherein
S1 is a circumferential distance between the adjacent stoppers at the inner ends thereof; and
S2 is the circumferential distance between the adjacent stoppers at the outer ends thereof.

There are given similar gap distance S3 between each pad 27 and its adjacent stopper 29 at the outer end of the stopper and similar gap distance S4 between the seat 28 and its adjacent stopper 29 at the outer end of the stopper.

The dimensions of the gaps "S0", "S1", "S2", "S3" and "S4" are determined by the pump design with consideration being given to such matters as what liquid is to be handled and what size of foreign material is to be anticipated in such liquid.

The pump support 15 having the construction as above explained will serve as the strainer under the operation of the pump.

When the pump is energized through the cable 4, the impeller 17 is rotated to suck the liquid through the passages (S1, S2, S3, S4 and S0) of the strainer 15 and the suction opening 21. Within the pump casing 14, a vortex flow "α" identified in FIG. 1 is generated on each of the blades of the impeller 17 and this vortex flow is moved together with a larger vortex having its center coinciding with the axis of the shaft 6 and along the internal surface of the vortex chamber of the pump casing so as to be discharged through the discharge opening 22. During the movement of the liquid through the flow gaps "S0", "S1", "S2", "S3" and "S4", the foreign materials are trapped by the stoppers 29. When the motor of the pump is de-energized, the liquid in the delivery conduit will flow backward into the pump chamber with a pressure head larger than the ordinal suctioning pressure and will pass backwards through the suction opening 21 towards the strainer 15 where the liquid will pass through the gap passages "S0", "S1", "S2", "S3" and "S4" in the backward direction.

When the foreign materials in the backward flow lodge against the slanted surfaces 29b of the stoppers 29, such foreign materials rise along the slanted surfaces 29b and enter the gap "S0" and are forcibly returned to the original pond or pool.

Thus, due to the presence of slanted surfaces 29b and the free gap "S0", such foreign materials may be easily passed backwards through the strainer 15.

In the foregoing explanation, the strainer or pump support 15 has been explained with respect to its configuration and the effects derived therefrom. The effects of the strainer are further enhanced if the stopper 29 is made to be flexible. Such may be accomplished by molding the entire strainer 15 (excluding the bushings 25) from an elastic material such as rubber or plastic, etc. The bushings 25 may be positioned in place during the molding or they may be inserted after the molding. Alternatively, the stoppers 29 above may be made flexible by appropriately mounting the flexible stoppers 29 on the base 26.

Due to the configuration of the stoppers 29, the stopper 29 are relatively rigid in the direction A shown in FIG. 3, even if they are made flexible, compared to the direction B shown in FIG. 4. During the operation of the pump, the liquid containing foreign materials is moved in the direction A from the side of the upright edge 29a towards the slanted edge 29b, and the stopper 29 exhibits stiffness in this direction whereby the foreign materials are trapped by the stoppers 29. In the case where the pump is de-energized and backward flow of the liquid from the delivery conduit towards the outside of the pump through the strainer 15 takes place, foreign materials which have once passed through the strainer 15 towards the delivery conduit may lodge against the stoppers 29 during the backward flow. However, on such occasion, the foreign materials firstly come against the slanted edges 29b, as explained before, and rise along the slanted edges 29b and are then freed at the gap "S0" into the backward flow even if the foreign materials are elongated ones which span the opposite radial side surfaces of the stoppers. If the foreign materials are agglomerated into a mass and become lodged at the stoppers 29, flexible stoppers will warp in the direction B shown in FIG. 4 to make the dimension of "S0" larger so that such agglomerated foreign materials may pass therethrough. Further, if the stoppers 29 are made flexible, they may oscillate when the backward flow passes the stoppers so that, if any foreign material becomes attached to the stoppers, it is subjected to such oscillation by the backward flow every time the pump is de-energized and, thus, the strainer 15 is cleaned by the backward flow. Further, if it is found that some foreign materials are suspended on the stoppers at the time when the pump is not being operated, such foreign materials may be manually removed with the deformation of the stoppers by pulling such materials from outside.

If the whole support or strainer 15 is made elastic, it may also serve as an anti-shocking member when the pump is sunk to the bottom of the liquid or water. In actual operation, the pump is used for liquid which may not be clear due to the foreign materials contained therein and it would be difficult to determine when the pump reaches the bottom. Therefore, elasticity of the pump support gives the advantage of protecting the pump body from shock on hitting the bottom.

Figure 5:
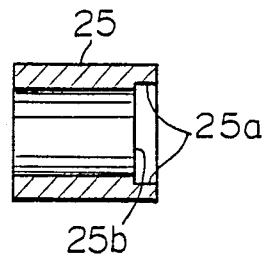
FIG. 5 is a cross-sectional view of a bushing employed in the strainer shown in FIGS. 1 and 2.
Figure 6:
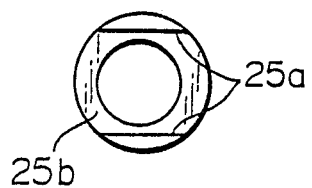
FIG. 6 is an end view of the bushing.
Figure 7:
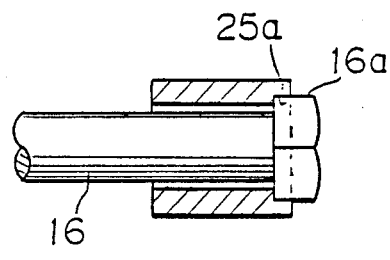
FIG. 7 shows the situation where a fastening bolt is received in the bushing shown in FIGS. 5 and 6.
Figure 8:
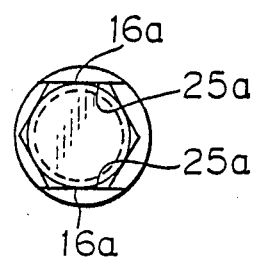
FIG. 8 is an end view of the situation shown in FIG. 7.

The pump or support is given further advantage in that each of the bushings 25 is slotted at one end as illustrated in FIGS. 5 thru. 8. As shown in FIGS. 5 and 6, one end of each bushing 25 is cut off to provide a slot having parallel opposite surfaces 25a which serve to prevent rotation of the head 16a of the bolt 16 as illustrated in FIGS. 7 and 8. Therefore, for fastening nuts 16b for the bolts 16, only a single tool may suffice to rotate the nuts 16b whereby assembling and disassembling the pump is made simple and easy.

The height of the support or strainer 15 measured in the axial direction is made smaller according to the present invention since such height is the sum of the thickness of the base 26, the height of the stopper 29 and the axial gap "S0," and the stoppers 29 are made thin in the circumferential direction thereby providing enough suctioning space even when the height of the strainer 15 is made small. Therefore, it is possible for the total height of the pump to be made small and suctioning liquid is effectively performed to a level close to the bottom.

Figure 9:
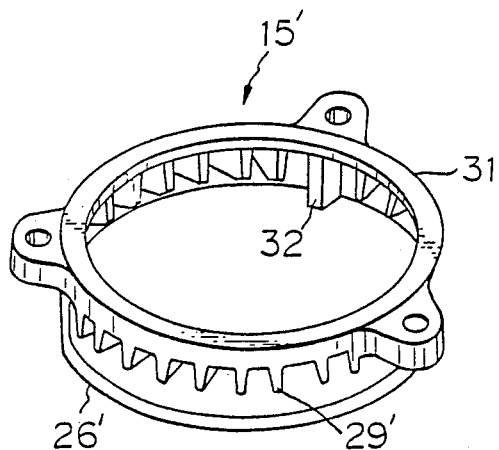
FIG. 9 is a perspective view of an alternative embodiment of the strainer according to the present invention.

As an alternative configuration of the strainer 15, another embodiment 15' is illustrated in FIG. 9. This strainer 15' comprises a base 26', an annular ring 31 having perforated ears or bushings and stoppers 29' circumferentially suspended downwardly from the ring 31, the ring 31 and the base 26' being connected by an appropriate number of columns 32. This strainer may also be unitarily molded from elastic material.

The invention has been explained in detail referring to the preferred embodiment. However, the present invention is not limited to what has been explained above and it may be modified by those skilled in the art within the spirit and scope of the present invention defined in the appended claims.

What is claimed is:

1. A submergible pump comprising:
   (a) a motor section including a frame encasing a motor therein and an intermediate casing which, in use, separates the motor from water while allowing a motor shaft to extend therethrough;
   (b) a pump impeller mounted on said motor shaft at a tip portion thereof extended through said intermediate casing;
   (c) a pump casing provided with a discharge opening and a suction opening and adapted to be coupled to said intermediate casing and to encase said impeller; and
   (d) a pump support couplable to said pump casing at the lowermost position of said pump and serving as a strainer for the pump;
   (e) said support, said pump casing and said motor section being fastened together only with a plurality of bolts extending through the elements in the sequence noted, said support being provided with a plurality of bushings at the peripheral portions thereof, each of said bushings being cut off at one end to form a slot which prevents the associated bolt from being turned when the head of the bolt is received in said slot.

2. A submergible pump as claimed in claim 1 wherein said support includes:
   (a) a base member and
   (b) a plurality of stoppers disposed perpendicularly relative to said base member and on the upper side thereof at the peripheral portion thereof, each of said stoppers extending in the direction from the peripheral to the central portion, the height of said stoppers being short of the total height of the support so that a flow passage is provided at the axial tip of each of said stoppers communicating the passage at the opposite side surfaces of said stoppers with each other, each of said stoppers being given a slanted edge at the portion near the central portion of the support, an upright edge parallel to a pump axis near the outer periphery of the support, and a tip edge connecting said slanted edge and said upright edge while leaving a space between said tip edge and the outer surface of the pump casing within the range of the total height of the support.

3. A submergible pump is claimed in claim 2 wherein said support is made of elastic material.

* * * * *